United States Patent
Kazami

(10) Patent No.: US 10,536,642 B2
(45) Date of Patent: Jan. 14, 2020

(54) IMAGE STABILIZATION APPARATUS THAT CORRECTS FOR IMAGE BLURRING, CONTROL METHOD THEREFOR, IMAGE PICKUP APPARATUS, AND STORAGE MEDIUM

(71) Applicant: CANON KABUSHIKI KAISHA, Tokyo (JP)

(72) Inventor: Yusuke Kazami, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 150 days.

(21) Appl. No.: 15/489,966

(22) Filed: Apr. 18, 2017

(65) Prior Publication Data
US 2017/0310869 A1  Oct. 26, 2017

(30) Foreign Application Priority Data
Apr. 20, 2016 (JP) .................................. 2016-084413

(51) Int. Cl.
*H04N 5/232* (2006.01)

(52) U.S. Cl.
CPC ....... *H04N 5/2328* (2013.01); *H04N 5/23212* (2013.01); *H04N 5/23258* (2013.01)

(58) Field of Classification Search
CPC ............. H04N 5/2328; H04N 5/23212; H04N 5/23258
See application file for complete search history.

(56) References Cited

U.S. PATENT DOCUMENTS 5,832,314 A * 11/1998 Hamada ............... G02B 27/646
  396/55
6,295,412 B1 * 9/2001 Katano .................... G03B 5/00
  396/349
2008/0180536 A1 * 7/2008 Nakahara ............... H04N 5/232
  348/208.99

(Continued)

FOREIGN PATENT DOCUMENTS

CN  1611975 A   5/2005
CN  1860779 A   11/2006

(Continued)

OTHER PUBLICATIONS

The above foreign patent documents were cited in a Sep. 29, 2019 Chinese Office Action, which is enclosed with an English Translation, that issued in Chinese Patent Application No. 201710262587.7.

*Primary Examiner* — Antoinette T Spinks
(74) *Attorney, Agent, or Firm* — Cowan, Liebowitz & Latman, P.C.

(57) ABSTRACT

An image stabilization apparatus which is capable of properly correcting for image blurring while at the same time obtaining correct focus evaluation values. Based on a detected shake, a vibration isolation lens is moved in a direction different from a direction of an optical axis of a shooting optical system. While a focus lens is being moved in the direction of the optical axis, focus evaluation values are obtained based on an image pickup signal obtained by taking an image of a subject. A method to control the focus lens is determined according to whether or not the focus lens is being moved, and with the determined method, movement of the focus lens in the direction of the optical axis is controlled based on an amount by which the vibration isolation lens has moved.

15 Claims, 8 Drawing Sheets

(56) References Cited

U.S. PATENT DOCUMENTS

| | | | |
|---|---|---|---|
| 2011/0019109 A1* | 1/2011 | Maeda | G03B 21/00 |
| | | | 348/745 |
| 2011/0261251 A1 | 10/2011 | Okamoto et al. | |
| 2012/0092511 A1* | 4/2012 | Wakamatsu | G02B 27/646 |
| | | | 348/208.2 |
| 2013/0163972 A1* | 6/2013 | Miyazawa | H04N 5/23258 |
| | | | 396/55 |
| 2015/0195458 A1* | 7/2015 | Nakayama | G03B 5/00 |
| | | | 348/208.11 |
| 2016/0205312 A1* | 7/2016 | Ito | G03B 13/36 |
| | | | 348/345 |
| 2017/0013199 A1* | 1/2017 | Kunugi | G02B 27/646 |
| 2017/0310869 A1* | 10/2017 | Kazami | H04N 5/23212 |

FOREIGN PATENT DOCUMENTS

| | | |
|---|---|---|
| CN | 101710205 A | 5/2010 |
| CN | 104125393 A | 10/2014 |
| JP | 2009-145852 A | 7/2009 |
| WO | 2015/156042 A1 | 10/2015 |

\* cited by examiner

IMAGE STABILIZATION APPARATUS THAT CORRECTS FOR IMAGE BLURRING, CONTROL METHOD THEREFOR, IMAGE PICKUP APPARATUS, AND STORAGE MEDIUM

BACKGROUND OF THE INVENTION

Field of the Invention

The present invention relates to an image stabilization apparatus which corrects for image blurring, a control method therefor, an image pickup apparatus, and a storage medium.

Description of the Related Art

As resolutions of image pickup apparatuses such as cameras and videos are increasing lately, there is a demand for an improvement in a function of reducing changes in an angle of view caused by shakes, such as camera shake, applied to the image pickup apparatuses. Ways of image stabilization are roughly divided into optical vibration isolation and electronic vibration isolation. With the optical vibration isolation, a vibration isolation lens (image stabilization lens) constituting a part of a shooting optical system is provided movably in a direction substantially perpendicular to an optical axis, and the vibration isolation lens is driven in such a direction as to cancel for a shake.

On the other hand, typical focus adjustment methods that have conventionally been employed include a triangulation method and a contrast AF method. In the contrast AF method, automatic focus adjustment (AF) is performed using focus evaluation values (contrast evaluation values) obtained by extracting specific frequency components through filtering from a luminance signal obtained from an image pickup device. Japanese Laid-Open Patent Publication (Kokai) No. 2009-145852 discloses a technique that, in order to reduce effects of camera shake on focusing accuracy, obtains an in-focus position by changing a weight assigned to an in-focus position obtained by the triangulation method and changing a weight assigned to an in-focus position obtained by the contrast AF method according to a degree of camera shake.

However, when the vibration isolation lens is driven to be moved far away from the optical axis so as to meet the recent demand for an improvement in the performance of an image stabilization mechanism, a change in optical performance leads to a problem that a subject contrast at a center of an image lowers. To solve this problem, a focus lens is driven in a direction of the optical axis to make up for an amount by which the vibration isolation lens has moved so that the subject contrast at the center of the image can be maintained.

On the other hand, with AF control using the contrast AF method, what is called mountain obtainment scanning, in which focus evaluation values is obtained while a position of the focus lens is changed by a predetermined amount at predetermined intervals so as to detect contrast levels of a subject, is performed immediately before shooting. Assuming here that while the mountain obtainment scanning is being performed, the focus lens is driven to make up for an amount by which the vibration isolation lens has moved as described above, the mountain obtainment scanning cannot be properly performed, and hence correct focus evaluation values may not be obtained. As a result, the focus lens cannot be driven to a correct in-focus position, and this may decrease the focusing accuracy of an image taken by shooting.

SUMMARY OF THE INVENTION

The present invention provides an image stabilization apparatus and a control method therefor, which are capable of properly correcting for image blurring while at the same time obtaining correct focus evaluation values, an image pickup apparatus, and a storage medium.

Accordingly, the present invention provides an image stabilization apparatus which, based on a shake detected by a detecting unit that detects a shake, causes a correction unit to move in a direction different from a direction of an optical axis of a shooting optical system, comprising an obtaining unit configured to move a focus lens in the direction of the optical axis to obtain focus evaluation values based on an image pickup signal obtained by taking an image of a subject, and a control unit configured to determine a method of controlling the focus lens according to whether the focus lens is being moved, and with the determined method, control movement of the focus lens in the direction of the optical axis based on an amount by which the correction unit has been moved.

According to the present invention, image blurring is properly corrected for while at the same time correct focus evaluation values are obtained.

Further features of the present invention will become apparent from the following description of exemplary embodiments (with reference to the attached drawings).

DESCRIPTION OF THE EMBODIMENTS

Hereafter, an embodiment of the present invention will be described with reference to the drawings.

Figure 1:
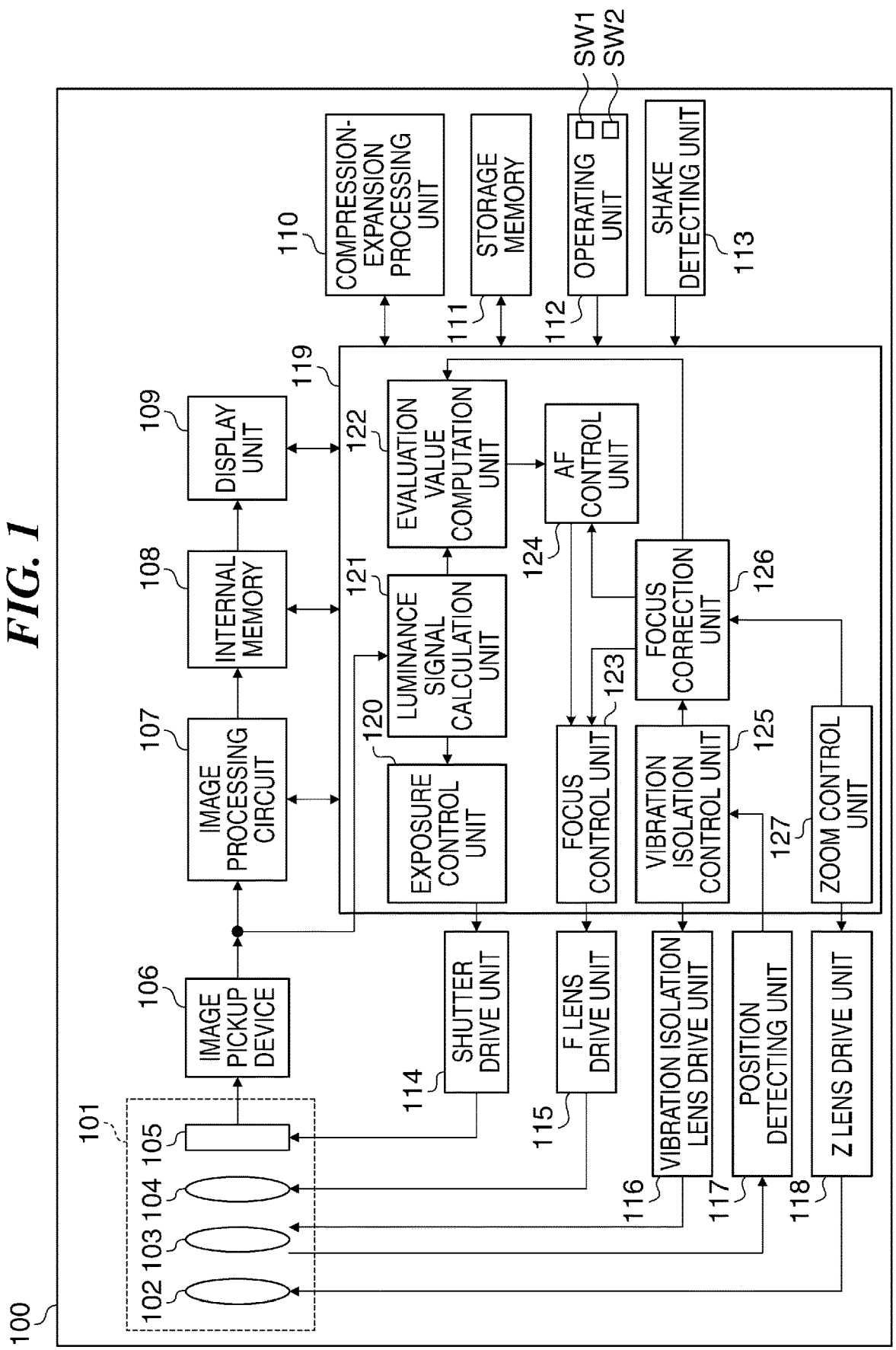
FIG. 1 is a block diagram showing an image pickup apparatus to which an image stabilization apparatus is applied.

FIG. 1 is a block diagram showing an image pickup apparatus to which an image stabilization apparatus according to the embodiment of the present invention is applied. The image pickup apparatus 100 is configured as a digital camera, for example. The image pickup apparatus 100 has a lens barrel 101. The lens barrel 101 holds therein lens groups, which constitutes a shooting optical system, and drives lenses. The lens groups include a zoom lens (hereafter referred to as the Z lens) 102, a vibration isolation lens 103, and a focus lens (hereafter referred to as the F lens) 104. The Z lens 102 optically changes an angle of view by adjusting a focal length. The vibration isolation lens 103 is a stabilization lens (stabilization unit) which is provided movably in a direction different from an optical axis of the shooting optical system, i.e. a direction substantially perpendicular to the optical axis, and corrects for image blurring by shifting from the optical axis. The F lens 104 moves in the direction of the optical axis to adjust a focus. A diaphragm-shutter 105 is for use in exposure control that adjusts an amount of light.

Light that has passed through the lens barrel 101 is received by an image pickup device 106, which is comprised of a CCD (charge-coupled device), CMOS (complementary metal oxide semiconductor), or the like, and converted from a light signal into an electric signal. The electric signal is input to an image processing circuit 107, subjected to a pixel interpolation process, a color conversion process, and so forth, and then sent as image data to an internal memory 108. A display unit 109 displays, for example, shooting information as well as image data obtained by image pickup. A compression-expansion processing unit 110 compresses and expands data, which is stored in the internal memory 108, according to image formats. A storage memory 111 is a storage unit for temporarily storing data such as image data. An operating unit 112 is a user interface through which a variety of menu operations are performed, and modes are selected. For example, on the operating unit 112, a user is allowed to switch between a still image shooting mode and a moving image shooting mode. The operating unit 112 has a release button comprised of a first switch SW1 and a second switch SW2 which are turned on in succession according to an amount of depression. When the release button is pressed about halfway down, the first switch SW is turned on, and when the release button is pressed all the way down, the second switch SW2 is turned on.

A shake detecting unit 113 has, for example, an angular velocity sensor or an acceleration sensor and detects a shake or wobble applied to the image pickup apparatus 100. A shutter drive unit 114 drives the diaphragm-shutter 105. An F lens drive unit 115 drives the F lens 104. A vibration isolation lens drive unit 116 is a moving unit that drives the vibration isolation lens 103. A position detecting unit 117 detects a current position of the vibration isolation lens 103 in a direction substantially perpendicular to the optical axis. A Z lens drive unit 118 drives the Z lens 102.

A system control unit 119 (an obtaining unit, a control unit) is comprised of a computation device such as a CPU (central processing unit), not shown. In response to operations by the user, the system control unit 119 executes a variety of control programs stored in the internal memory 108, for example, programs for providing AE control, AF control, vibration isolation control, zoom control, and so forth. In the system control unit 119, a luminance signal calculation unit 121 calculates an electric signal, which is output from the image pickup device 106, as a luminance of a subject. An evaluation value computation unit 122 extracts specific frequency components from the luminance signal calculated by the luminance signal calculation unit 121 and computes focus evaluation values (also referred to as AF evaluation values or contrast evaluation values). An AF control unit 124 instructs a focus control unit 123 to drive the F lens 104 over a predetermined range, and by referring to focus evaluation values at respective positions of the F lens 104, calculates a shape of a contrast. The AF control unit 124 provides auto focus (AF) control to determine a focus position, at which the contrast is at its peak, as a position at which a bundle of rays comes to a focus on a plane of the image pickup device 106. The focus control unit 123 controls a direction in which and an amount by which the F lens 104 is driven.

Based on information from the shake detecting unit 113, a vibration isolation control unit 125 calculates a direction in which and an amount by which the vibration isolation lens 103 should be moved so as to cancel for image blurring and notifies the vibration isolation lens drive unit 116 of the calculated direction and amount. Vibration isolation control is provided by the vibration isolation lens drive unit 116 driving the vibration isolation lens 103 so as to cancel for image blurring. A focus correction unit 126 corrects a position of the F lens 104 according to a position (correction amount) of the vibration isolation lens 103 relative to a center of the optical axis. In accordance with a zooming instruction issued through the operating unit 112, a zoom control unit 127 calculates a direction in which and an amount by which the Z lens 102 is to be driven, and in accordance with a result of the calculation, the Z lens drive unit 118 drives the Z lens 102.

When the first switch SW1 on the operating unit 112 is turned on, the exposure control unit 120 computes exposure control values (an aperture value and a shutter speed) based on luminance information obtained by the luminance signal calculation unit 121 and sends a result of the computation to the shutter drive unit 114. Auto exposure (AE) control is provided by the shutter drive unit 114 driving the diaphragm-shutter 105 according to the result of the computation. When the second switch SW2 on the operating unit 112 is turned on, the exposure control unit 120 performs shooting based on the determined aperture value and shutter speed, and image data obtained as a result of image pickup by the image pickup device 106 is stored in the storage memory 111.

Figure 2A:
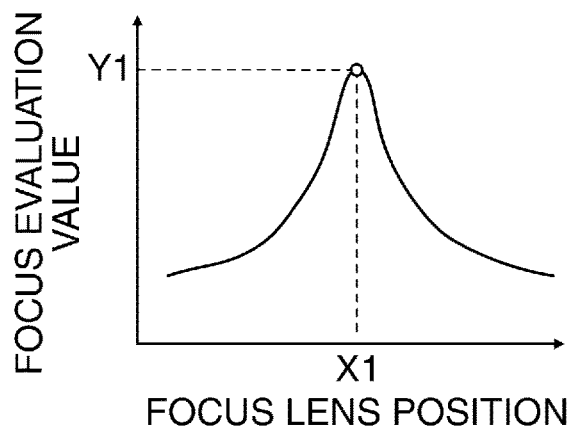
FIGS. 2A and 2B are views showing a relationship between positions of an F lens in a direction of an optical axis and focus evaluation values.
Figure 2C:
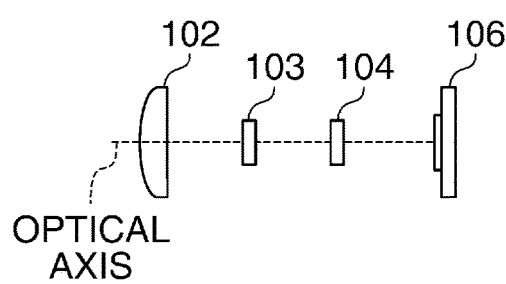
FIGS. 2C and 2D are schematic diagrams showing positions of lens groups.
Figure 2B:
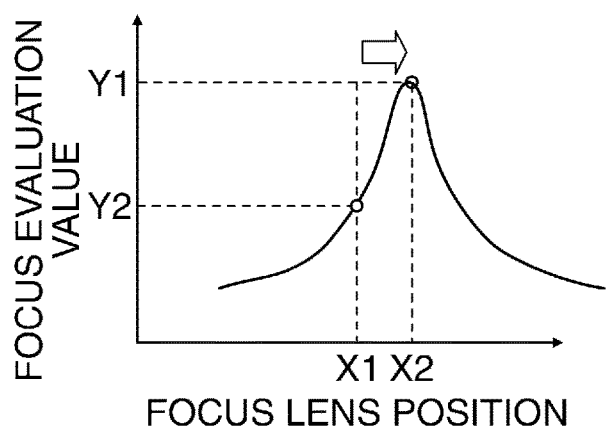
Figure 2D:
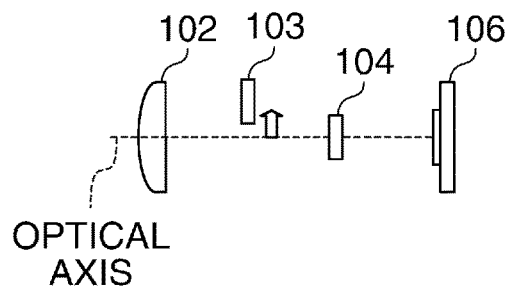

Referring now to FIGS. 2A to 2D, a description will be given of a subject being out of focus, which is a phenomenon that occurs when the vibration isolation lens 103 shifts from the optical axis. FIGS. 2A and 2B are views showing a relationship between positions of the F lens 104 in the direction of the optical axis and focus evaluation values. In FIGS. 2A and 2B, the horizontal axis indicates positions of the F lens 104, and the vertical axis indicates focus evaluation values. FIGS. 2C and 2D are schematic diagrams showing positions of corresponding lens groups. FIGS. 2A and 2C show a case where the vibration isolation lens 103 lies at the center of the optical axis, and FIGS. 2B and 2D show a case where the vibration isolation lens 103 decentered from the optical axis.

As shown in FIG. 2A, the focus evaluation value for a predetermined subject varies with positions of the F lens 104 to form a mountain shape due to differences in contrast levels. A top of the mountain is a position at which a subject contrast is at its peak, and when the F lens 104 lies at this position, a subject is in focus. When the vibration isolation lens 103 lies on the optical axis as with the other lens groups (FIG. 2C), the focus evaluation value is the greatest when the F lens 104 lies at a position X1 in the direction of the optical axis. When the vibration isolation lens 103 is caused to shift from the center of the optical axis (FIG. 2D) by driving the vibration isolation lens 103 in the state shown in FIG. 2C, the mountain formed by focus evaluation values for the subject shifts rightward (FIG. 2B). Namely, the position of the F lens 104 at which the focus evaluation value is the greatest shifts from the position X1 to a position X2.

For example, assuming that when the vibration isolation lens 103 lies on the optical axis, the F lens 104 is driven to and stops at the position X1 to bring the subject in focus, and after that, the vibration isolation lens 103 is moved in a direction perpendicular to the optical axis, the mountain formed by focus evaluation values for the subject shifts. Then, the focus evaluation value at the position X1 which was Y1 in the state shown FIG. 2A decreases to Y2 in the state shown in FIG. 2B. In this case, a shooting operation is performed with the focus evaluation value being small, and this may decrease focusing accuracy of an image taken by shooting. In addition to this, camera shake caused by photographer's movement is not constant but changes from moment to moment, and therefore, movement of the vibration isolation lens 103 as well is not constant, and a subject contrast changes at all times.

A description will now be given of a relationship of operation between the vibration isolation lens 103 and the F lens 104. In the following description, an amount (a vibration isolation angle) which represents a distance over which the vibration isolation lens 103 moves in a direction substantially perpendicular to the optical axis with respect to the center of the optical axis will be referred to as a "vibration isolation lens position". Also, an amount by which the F lens 104 should be driven in the direction of the optical axis so as to cancel for a peak shift of focus evaluation values in response to the vibration isolation lens 103 being driven to a position off the center of the optical axis will be referred to as an "F lens position correction amount".

Figure 3:
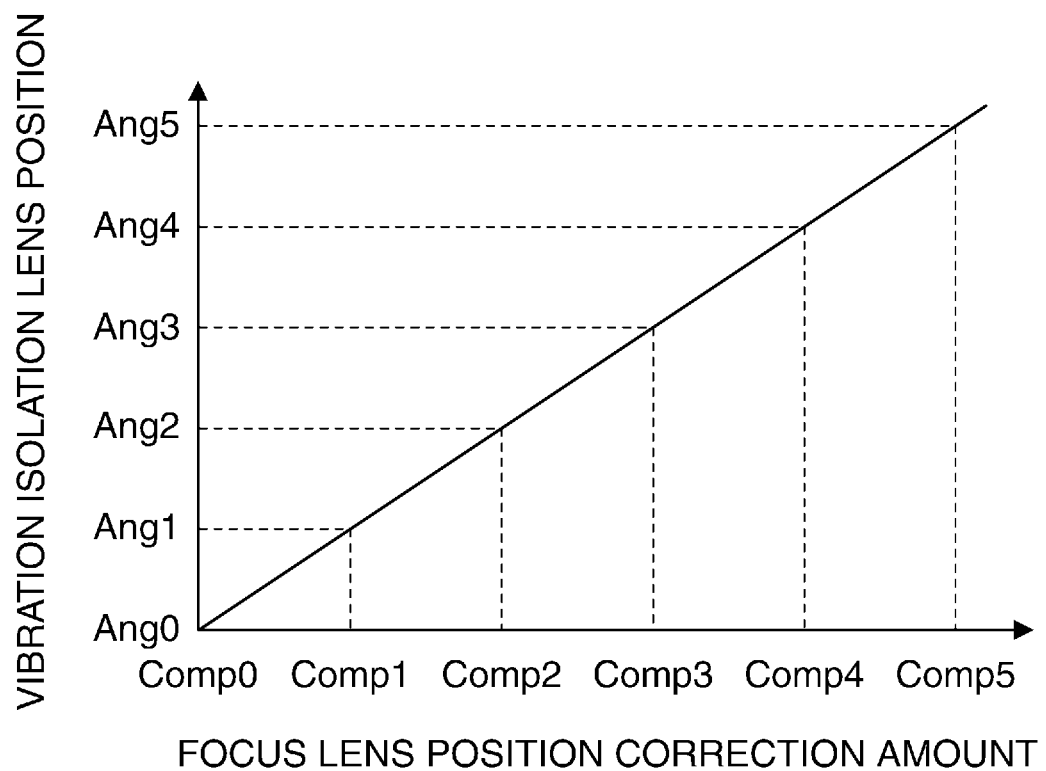
FIG. 3 is a conceptual diagram showing an exemplary correction table which shows a relationship between F lens position correction amounts and vibration isolation lens positions.

FIG. 3 is a conceptual diagram showing an exemplary correction table which shows a relationship between F lens position correction amounts and vibration isolation lens positions. In FIG. 3, the horizontal axis indicates F lens position correction amounts, and the vertical axis indicates vibration isolation lens positions. A vibration isolation lens position Ang0 means that a vibration isolation lens position is 0 degree, that is, the vibration isolation lens 103 lies at the center of the optical axis. An F lens position correction amount in this case is Comp0. In the present embodiment, a concrete numerical value of Comp0 is zero. A vibration isolation lens position is represented by Ang5 when the vibration isolation lens position is the farthest from the center of the optical axis. An F lens position correction amount in this case is Comp5.

By correcting a position of the F lens 104 by an amount corresponding to a change in vibration isolation lens position according to the correction table as described above, lowering of a subject contrast is prevented. It should be noted that numeric values of vibration isolation lens positions and F lens position correction amounts are determined by characteristics of the shooting optical system and stored as designed values, which are determined in advance, in the internal memory 108. It should be noted that although according to the correction table referred to above, the vibration isolation lens position and the F lens position correction amount are roughly proportional to each other, this is not limitative, but depending on characteristics of the optical system, their relationship may be represented by a curve.

Figure 4:
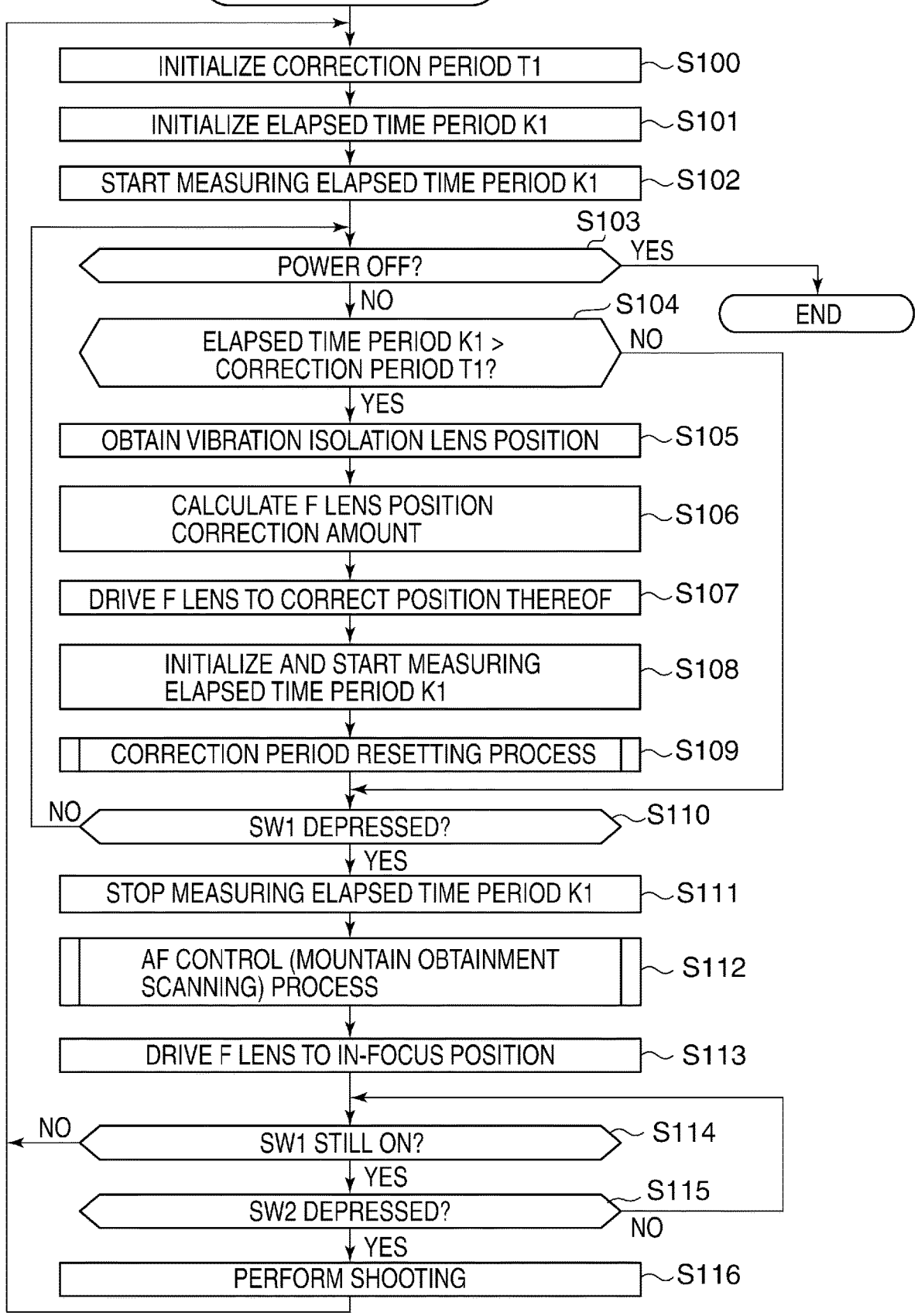
FIG. 4 is a flowchart showing a shooting process.

FIG. 4 is a flowchart showing a shooting process. The process in this flowchart is implemented by a CPU, which the system control unit 119 has, reading out and executing a program stored in a storage unit such as a ROM which the system control unit 119 has. This process is started when power to the apparatus is turned on through operation on the operating unit 112.

First, in step S100, the system control unit 119 initializes a first correction period T1, which is a period for correcting a position of the F lens 104 according to a vibration isolation lens position. Here, the system control unit 119 sets an initial value Td, which is determined in advance, as the first correction period T1. In step S101, the system control unit 119 initializes an elapsed time period K1, which has elapsed since correction of the position of the F lens 104 was started, or namely, sets the elapsed time period K1 to zero. In step S102, the system control unit 119 starts measuring the elapsed time period K1. It should be noted that a relationship between the first correction period T1 and the elapsed time period K1 will be described later in detail.

In step S103, based on a state of the operating unit 112, the system control unit 119 determines whether or not the power to the image pickup apparatus has been turned off. When the power to the image pickup apparatus has been turned off, the system control unit 119 ends the process in FIG. 4, and on the other hand, when the power to the image pickup apparatus continues to be on, the process proceeds to step S104. In the step S104, the system control unit 119 determines whether or not the elapsed time period K1 is longer than the first correction period T1 (K1>T1). When K1>T1 holds, the process proceeds to step S105, and on the other hand, when K1≤T1 holds, the process proceeds to step S110.

In step S105, the system control unit 119 obtains a current vibration isolation lens position based on an output from the position detecting unit 117. In step S106, with reference to the correction table (FIG. 3), the system control unit 119 calculates an F lens position correction amount (Comp) according to the vibration isolation lens position (Ang) obtained in the step S105. In step S107, based on the F lens position correction amount calculated in the step S106, the system control unit 119 controls the F lens drive unit 115 to drive the F lens 104 to correct its position. Namely, the system control unit 119 drives the F lens 104 to a targeted position which is found by adding the F lens position correction amount to a position of the F lens 104 lying in a state where the vibration isolation lens position is at the center of the optical axis (a state where an F lens position has not been corrected).

In step S108, the system control unit 119 initializes the elapsed time period K1, that is, sets the elapsed time period K1 to zero, and also starts measuring the elapsed time period K1. In step S109, the system control unit 119 carries out a correction period resetting process (FIG. 5) in which it resets the first correction period T1 as the need arises based on judgment conditions determined in advance.

Figure 5:
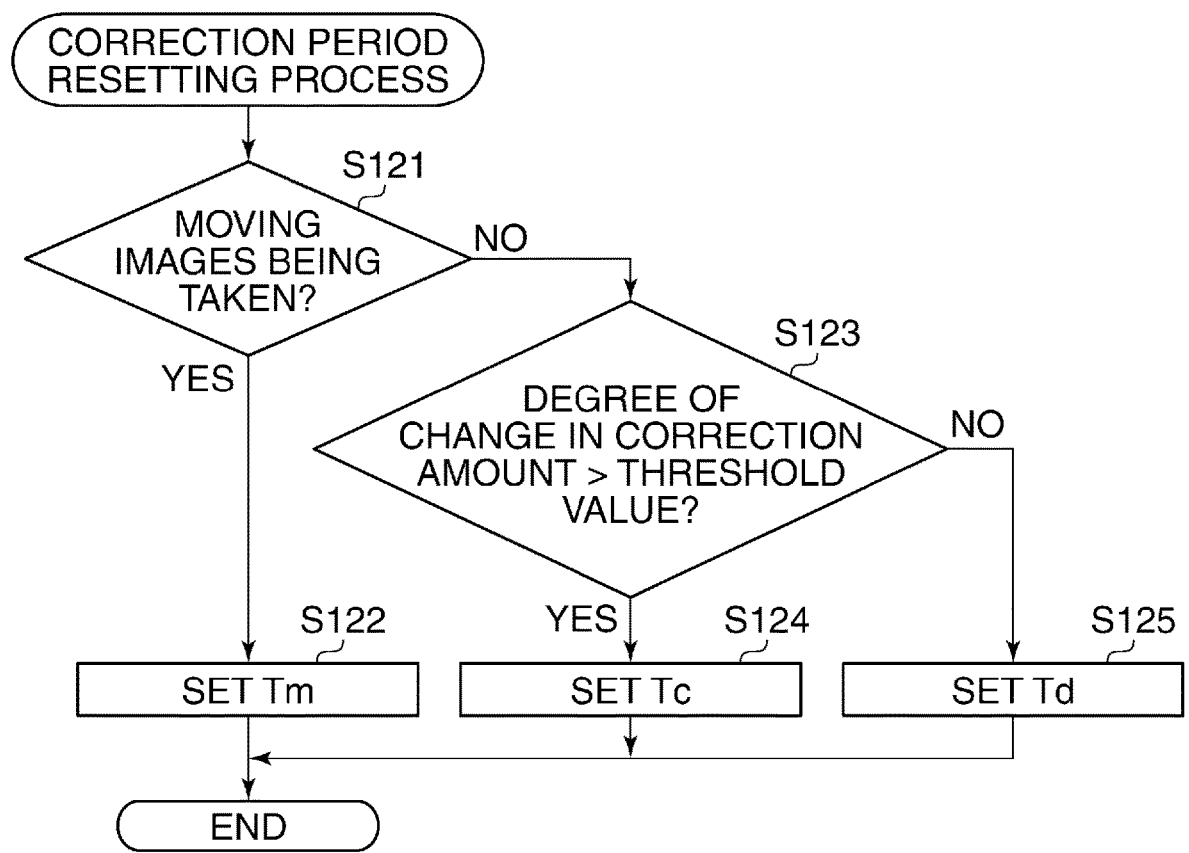
FIG. 5 is a flowchart showing a correction period resetting process.

FIG. 5 is a flowchart showing the correction period resetting process. First, the system control unit 119 determines whether or not moving images are being currently taken (step S121), and when moving images are being taken, the system control unit 119 sets a predetermined period Tm, which is determined in advance, as the first correction period T1 (step S122). On the other hand, when no moving images are being taken, the system control unit 119 determines whether or not a degree of change in the F lens position correction amount is greater than a threshold value (step S123).

Here, the degree of change in the F lens position correction amount is calculated from a position correction amount calculated last time in the step S106 in FIG. 4 and a position correction amount calculated this time. Alternatively, the system control unit 119 may store, in the internal memory 108, the F lens position correction amounts calculated in the step S106 as occasion arises, and calculate the degree of change from a plurality of F lens position correction amounts stored in the past. It should be noted that the degree of change may be either a ratio or a difference.

As a result of the determination in the step S123, when the degree of change in the F lens position correction amount is greater than the threshold value, the system control unit 119 sets a predetermined period Tc, which is determined in advance, as the first correction period T1 (step S124). On the other hand, when the degree of change in the F lens position correction amount is not greater than the threshold value, the system control unit 119 sets the first correction period T1 to the initial value Td again.

It should be noted that the predetermined period Tm is set to be shorter than the initial value Td. This is because more elaborate control is required when moving images are being taken than when no moving images are being taken. While moving images are being taken, the F lens 104 is driven to correct its position (focus adjustment) at shorter intervals than when no moving images are being taken, so that a focus can be corrected with high accuracy. On the other hand, when no moving images are being taken, the number of times the F lens 104 is driven in a compensating manner is reduced, which brings about a reduction in power consumption. Also, the predetermined period Tc is set to be smaller than the initial value Td. A situation in which a degree of change in the F lens position correction amount is large is a situation in which a position of the vibration isolation lens 103 frequently and largely changes due to strong camera shake. In this case, elaborate control is required. For example, when a degree of change in the F lens position correction amount is large, focus correction is carried out at shorter intervals than when a degree of change in the F lens position correction amount is small, so that a focus can be corrected with high accuracy. On the other hand, when a degree of change in the F lens position correction amount is small, the number of times the F lens 104 is driven in a compensating manner is reduced, which brings about a reduction in power consumption. After the steps S122, S123, and S125, the process in FIG. 5 is ended.

In the step S110, the system control unit 119 determines whether or not the first power switch SW1 on the operating unit 112 has been turned on, and when the first power switch SW1 has not been turned on, the process returns to the step S103. On the other hand, when the system control unit 119 determines that the first power switch SW1 has been turned on, the process proceeds to step S111.

While the steps S103 to S110 are being repeatedly executed, "mountain obtainment scanning" which obtains focus evaluation values based on an image pickup signal obtained by taking an image of a subject while driving the F lens 104 in the direction of the optical axis is not performed. Thus, in the state where the F lens 104 is not being driven so as to obtain focus evaluation values, the F lens 104 is drivingly controlled by driving the F lens 104 to correct its position (step S107). Namely, the system control unit 119 calculates an F lens position correction amount based on an amount by which the vibration isolation lens 103 has moved, and controls a position of the F lens 104 based on the calculated F lens position correction amount. This is carried out with the first correction period T1. An example of this control will be described referring to FIGS. 6A and 6B.

Figure 6A:
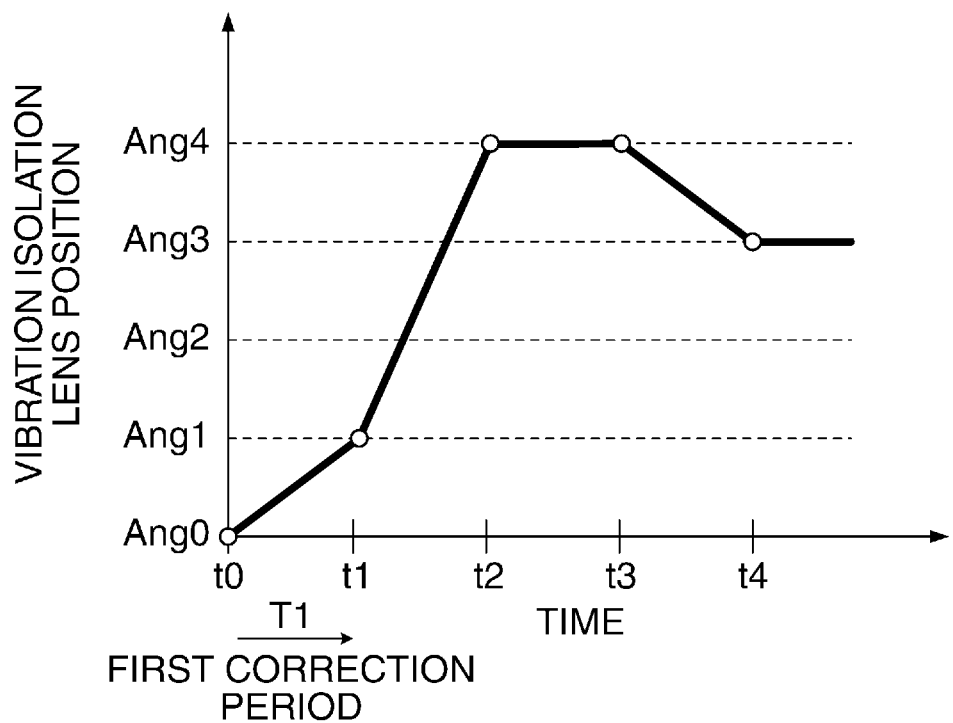
FIG. 6A is a diagram showing exemplary changes in vibration isolation lens position.
Figure 6B:
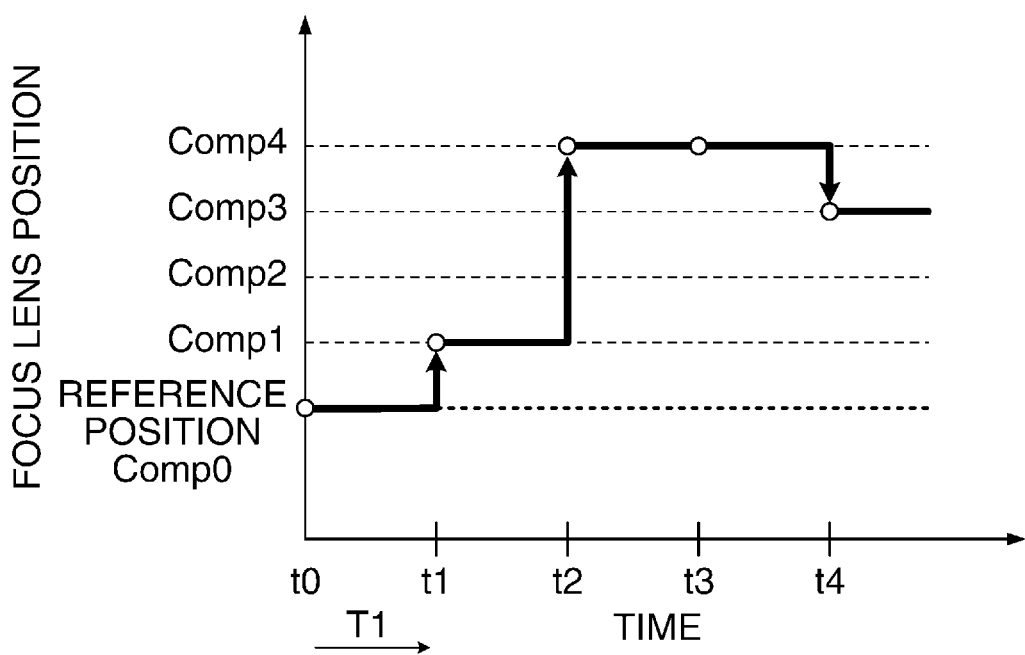
FIG. 6B is a diagram showing exemplary changes in the position of the F lens in a case where the F lens is driven for compensation by providing position correction control.

FIG. 6A is a diagram showing exemplary changes in the position of the vibration isolation lens with time. In FIG. 6A, the horizontal axis indicates time, and the vertical axis indicates the vibration isolation lens positions. FIG. 6B is a diagram which corresponds to FIG. 6A and shows exemplary changes in the position of the F lens 104 with time when the F lens 104 is driven for compensation by providing position correction control. In FIG. 6B, the horizontal axis indicates time, and the vertical axis indicates positions of the F lens 104. A time t0 is a time at which the power to the image pickup apparatus is turned on, or a time at which the F lens 104 was driven to correct its position last time.

Referring to FIG. 6A, a vibration isolation lens position at the time t0 is Ang0. According to the correction table (FIG. 3), an F lens position correction amount associated with the vibration isolation lens position Ang0 is Comp0 (zero), and hence for a position of the F lens 104 at the time t0 in FIG. 6B, no consideration is given to driving of the F lens 104 aimed at correcting its position. This position of the F lens 104 for which no consideration is given to focus correction is defined as a reference position.

At a time t1 until which the first correction period T1 has elapsed since the time t0 is Ang1 (FIG. 6A). According to the correction table (FIG. 3), an F lens position correction amount associated with the vibration isolation lens position Ang1 is Comp1. Therefore, at the time t1, the system control unit 119 drives the F lens 104 to a position obtained by adding Comp1 to the reference position. At a time t2 until which the first correction period T1 has elapsed since the time t1 is Ang4 (FIG. 6A). According to the correction table (FIG. 3), an F lens position correction amount associated with the vibration isolation lens position Ang4 is Comp4. Therefore, at the time t2, the system control unit 119 drives the F lens 104 to a position obtained by adding Comp4 to the reference position. After that, in the same manner, a shake is properly corrected for by determining an F lens position correction amount according to a vibration isolation lens position at a time point when the first correction period T1 has elapsed, and driving the F lens 104 to a position obtained by adding the F lens position correction amount to the reference position. It should be noted that when, for example, a vibration isolation lens position is a value between certain specified values in the correction table, an F lens position correction amount may be found by interpolation.

Referring again to FIG. 4, in the step S111, the system control unit 119 stops measuring the elapsed time period K1. Then, in step S112, the system control unit 119 carries out an AF control (mountain obtainment scanning) process (FIG. 7) to determine an in-focus position of the F lens 104. This AF control process will be described later with reference to FIG. 7. After that, in step S113, the system control unit 119 drives the F lens 104 to the in-focus position of the F lens 104 determined in the step S112.

Then, in step S114, the system control unit 119 determines whether or not the first power switch SW1 of the operating unit 112 is continuing to be on, and when the first power switch SW1 is not continuing to be on, the process returns to the step S100. On the other hand, when the first power switch SW1 is continuing to be on, the process proceeds to step S115 in which the system control unit 119 in turn determines whether or not the second power switch SW2 of the operating unit 112 has been turned on. When the system control unit 119 determines that the second power switch SW2 has not been turned on, the process returns to the step S114. On the other hand, when the system control unit 119 determines that the second power switch SW2 has been turned on, the system control unit 119 performs a shooting operation in step S116. After that, the process returns to the step S100.

Figure 7:
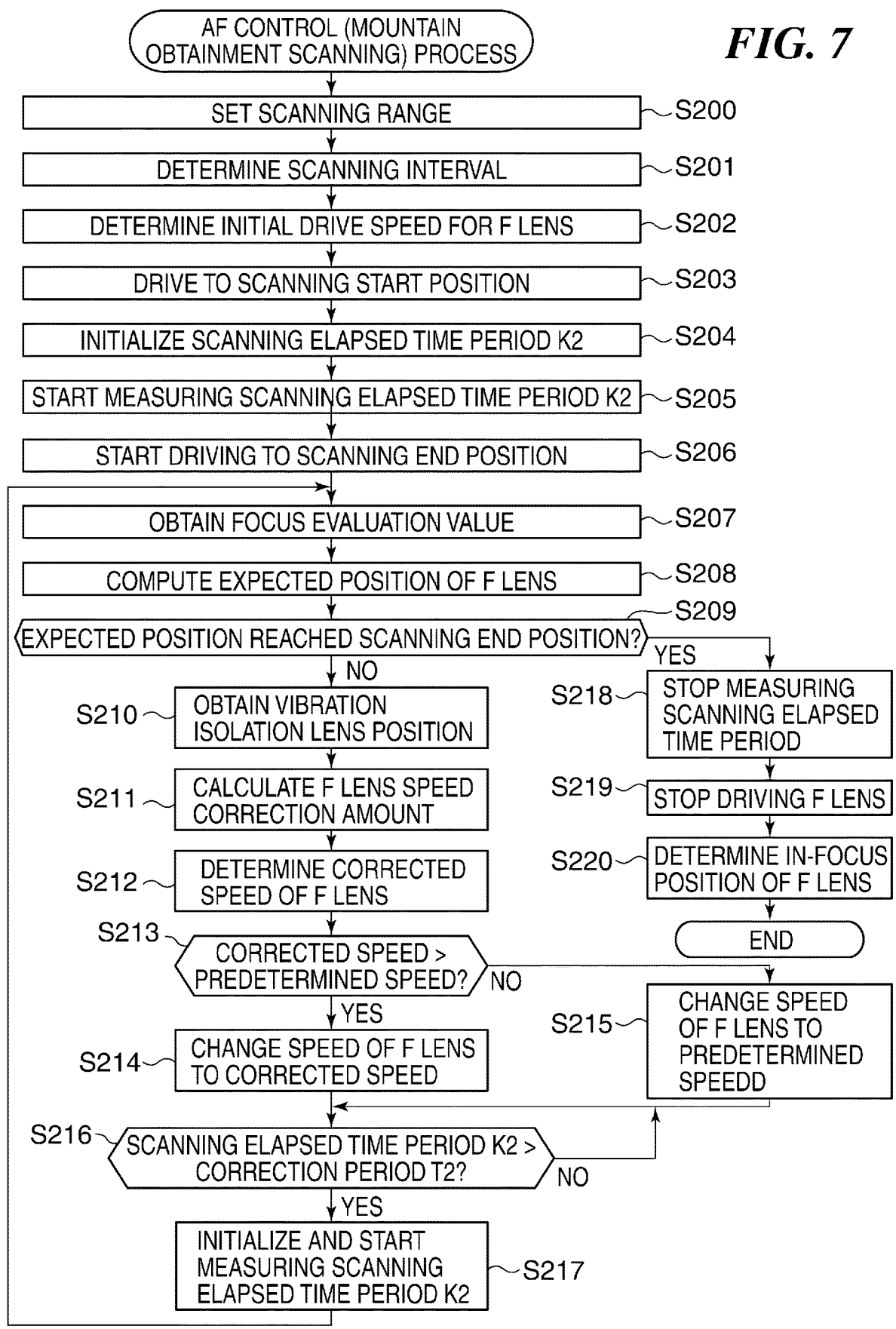
FIG. 7 is a flowchart showing an AF control (mountain obtainment scanning) process.

FIG. 7 is a flowchart showing the AF control (mountain obtainment scanning) process which is carried out in the step S112 in FIG. 4. First, in step S200, the system control unit 119 determines a scanning range over which the mountain obtainment scanning is to be performed. One end of the scanning range in a direction in which a subject in a close range is in focus is defined as a scanning start position, and the other end of the scanning range in a direction in which a subject in a telephoto range is in focus is defined as a scanning end position. It should be noted that for the scanning range, the scanning start position, and the scanning end position, no consideration is given to focus correction described earlier, that is, the vibration isolation lens 103 is assumed to be at the center of the optical axis.

In step S201, the system control unit 119 determines time intervals at which scanning is to be performed. In step S202, the system control unit 119 determines an initial drive speed for the F lens 104. In step S203, the system control unit 119 drives the F lens 104 to the scanning start portion in the scanning range determined in the step S200. After the driving to the scanning start position is completed, the process proceeds to step S204. In the step S204, the system control unit 119 initializes a scanning elapsed time period K2, that is, sets it to zero. Here, the scanning elapsed time period K2 is a time period that has elapsed since the F lens 104 started to be driven toward the scanning end position (in step S206 to be described later), or a time period that has elapsed since a focus evaluation value was obtained last time.

In step S205, the system control unit 119 starts measuring the scanning elapsed time period K2. In the step S206, the system control unit 119 starts driving the F lens 104 toward the scanning end position in the scanning range determined in the step S200. It should be noted that at this time, the F lens 104 is driven at the initial drive speed set in the step S202. After the driving toward the scanning end position is started, the process proceeds to step S207 irrespective of whether or not the driving to the scanning end position has been completed.

In the step S207, the system control unit 119 obtains a focus evaluation value in this period. Namely, the system control unit 119 extracts high-frequency components of a luminance signal and stores the computed focus evaluation value in the internal memory 108. In step S208, the system control unit 119 computes an expected position P of the F lens 104 and stores it in the internal memory 108 in association with the focus evaluation value obtained in the step S207. The expected position P of the F lens 104 means a position of the F lens 104 computed based on the time period that has elapsed since the F lens 104 started to be driven from the scanning start position toward the scanning end position in the step S206 and the initial drive speed determined in the step S202. Namely, the expected position P means a position reached by the F lens 104 at a time point when the step S208 is executed in a case where it is assumed that the F lens 104 is driven at the initial drive speed using the scanning start position as a reference position. In step S209, the system control unit 119 determines whether or not the expected position P computed in the step S208 has reached the scanning end position in the scanning range. When the system control unit 119 determines that the expected position P computed in the step S208 has not reached the scanning end position, the process proceeds to step S210, and on the other hand, when the system control unit 119 determines that the expected position P has reached the scanning end position, the process proceeds to step S218.

Figure 8A:
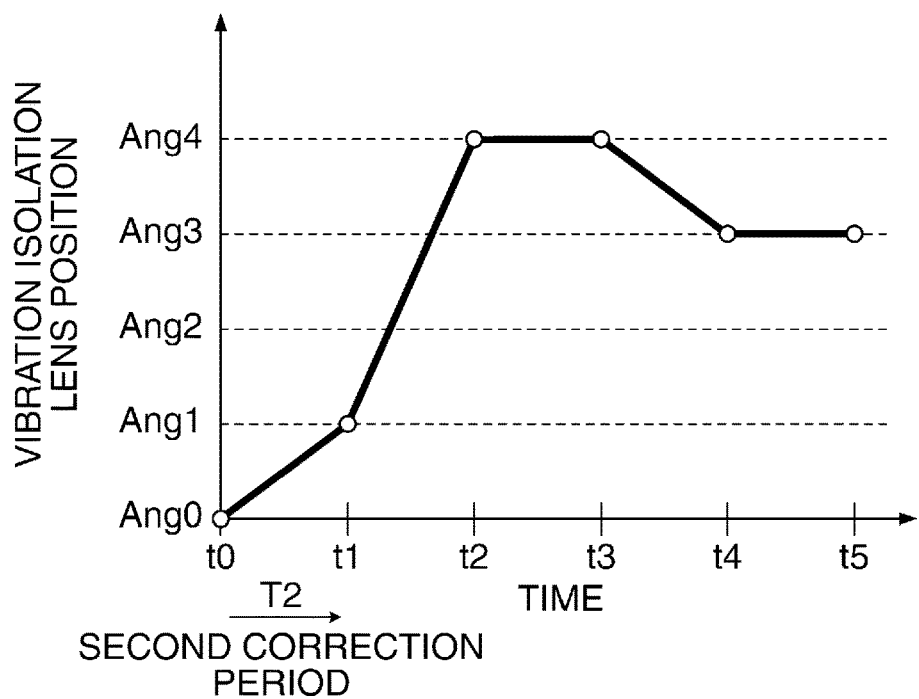
FIG. 8A is a diagram showing exemplary changes in vibration isolation lens positions.
Figure 8B:
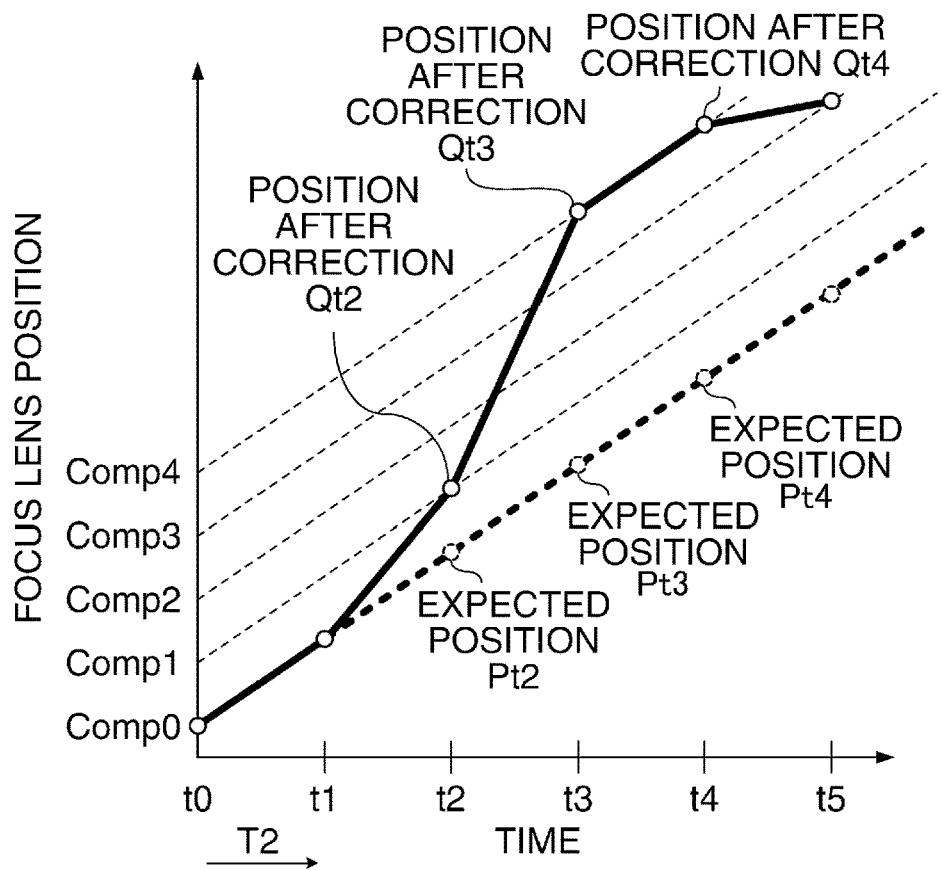
FIG. 8B is a diagram showing exemplary changes in the position of the F lens when the F lens is driven for compensation by providing speed correction control.

A description will now be given of the expected position P with reference to FIGS. 8A and 8B. FIG. 8A is a diagram showing exemplary changes in vibration isolation lens position with time. In FIG. 8A, the horizontal axis indicates time, and the vertical axis indicates vibration isolation lens positions. FIG. 8B is a diagram which corresponds to FIG. 8A and shows exemplary changes in the position of the F lens 104 with time when the F lens 104 is driven for compensation by providing control to correct the speed of the F lens 104. In FIG. 8B, the horizontal axis indicates time, and the vertical axis indicates positions of the F lens 104. A time t0 is a time at which driving of the F lens 104 from the scanning start position is started. In FIG. 8B, changes in a case where speed is corrected are shown by a solid lines, and changes in a case where speed is not corrected (changes in the expected position P) are shown by dotted lines. As shown by the dotted lines in FIG. 8B, the expected position P linearly changes.

In the step S210 in FIG. 7, the system control unit 119 obtains a current vibration isolation lens position from an output from the position detecting unit 117. In step S211, the system control unit 119 calculates a speed correction amount $\Delta V$ based on the vibration isolation lens position obtained in the step S210, and further, in step S212, determines a corrected speed cV based on the speed correction amount $\Delta V$ calculated in the step S211. In step S213, the system control unit 119 determines whether or not the corrected speed cV determined in the step S212 is higher than a predetermined speed (the corrected speed cV>the predetermined speed).

When the corrected speed cV is higher than the predetermined speed, the process proceeds to step S214, in which the system control unit 119 in turn changes the drive speed for the F lens 104 to the corrected speed cV determined in the step S212, followed by the process proceeding to step S216. On the other hand, when the corrected speed cV is not higher than the predetermined speed, the process proceeds to step S215, in which the system control unit 119 in turn changes the drive speed for the F lens 104 to the predetermined speed, followed by the process proceeding to the step S216. Here, the predetermined speed is a value determined in advance and used so as to limit the moving speed of the F lens 104. Therefore, a lower limit to the moving speed of the F lens 104 is the predetermined speed. This is because if the moving speed of the F lens 104 is set to an excessively low speed, the processing time of AF control would increase, resulting in performance degradation. By setting the lower speed limit to the predetermined speed, AF control processing is prevented from being delayed. In the step S216, the system control unit 119 waits until the scanning elapsed time period K2 has become longer than the second correction period T2 (K2>T2). Here, the second correction period T2 is set to a smaller value than the first correction period T1. When the scanning elapsed time period K2 has become longer than the second correction period T2, the system control unit 119 initializes the scanning elapsed time period K2 and starts measuring it in step S217, followed by the process returning to the step S207.

By repeatedly executing the steps S207 to S217, a speed correction amount $\Delta V$ and a corrected speed cV in every second correction interval T2 are calculated to correct the drive speed for the F lens 104 step by step. A description will now be given of an example in which a speed correction amount $\Delta V$ and a corrected speed cV are calculated. In the example shown in FIG. 8A, a vibration isolation lens position at the time t0 is Ang0. According to the correction table (FIG. 3), an F lens position correction amount associated with the vibration isolation lens position Ang0 is Comp0. The F lens position correction amount Comp0 is zero, and hence for a position of the F lens 104 at the time t0 in FIG. 8B, no consideration is given to driving of the F lens 104 aimed at correcting its position.

After that, the F lens 104 starts to be driven at the initial drive speed, and at a time t1 until which the second correction period T2 has elapsed since the time t0 is Ang1. According to the correction table (FIG. 3), an F lens position correction amount associated with the vibration isolation lens position Ang1 is Comp1. Therefore, at the time t1, a speed correction amount $\Delta Vt1$ and a correction speed $cVt1$ are determined by mathematical expressions 1 and 2 below, respectively. It should be noted that when a speed correction amount $\Delta V$, a correction speed $cV$, and an expected position P represent those at a specific time t, a symbol such as t2, t3, or the like is appended to them.

Speed correction amount $\Delta Vt1 = (F$ lens position correction amount Comp at time $t1 - F$ lens position correction amount Comp at time $t0$)/second correction period $T2$     [Mathematical Expression 1]

Corrected speed $cVt1 =$ drive speed at time $t0$ (initial drive speed at time $t0$)+speed correction amount $\Delta Vt1$     [Mathematical Expression 2]

The mathematical expression 2 indicates that the corrected speed cV of the F lens 104 is calculated by adding the speed correction amount $\Delta V$ calculated in the step S211 to a current speed set as the drive speed for the F lens 104 at present.

As a result of changing of the drive speed for the F lens 104 to the corrected speed cVt1 at the time t1, an actual position of the F lens 104 at a time t2 at which the second correction period T2 has elapsed since the time t1 is a position after correction Qt2 in FIG. 8B. On the other hand, the expected position P of the F lens 104 is an expected position Pt2.

Further, a vibration isolation lens position at the time t2 is Ang4. According to the correction table (FIG. 3), an F lens position correction amount associated with the vibration isolation lens position Ang4 is Comp4. A speed correction amount $\Delta Vt2$ and a corrected speed cVt2 at the time t2 are determined by mathematical expressions 3 and 4 below.

Speed correction amount $\Delta Vt2 = (F$ lens position correction amount Comp at time $t2 - F$ lens position correction amount Comp at time $t1$)/second correction period $T2$     [Mathematical Expression 3]

Corrected speed $cVt2 =$ drive speed at time $t1$ (corrected speed $cVt1$ at time $t1$)+speed correction amount $\Delta Vt2$     [Mathematical Expression 4]

As a result of changing of the drive speed for the F lens 104 to the corrected speed cVt2 at the time t2, an actual position of the F lens 104 at a time t3 at which the second correction period T2 has elapsed since the time t2 is a position after correction Qt3 in FIG. 8B. On the other hand, the expected position P of the F lens 104 is an expected position Pt3. Speed correction amounts $\Delta V$ and corrected speeds cV at the time t3 and the subsequent times as well are calculated by applying values t3, t4, . . . in place of the values at the time t1 in the mathematical expressions 1 and 2. Therefore, every time the second correction period T2 has elapsed, the drive speed for the F lens 104 is changed according to a vibration isolation lens position at that time point to thus correct a focus.

In the step S218 in FIG. 7, the system control unit 119 stops measuring the scanning elapsed time period K2, and in step S219, stops driving the F lens 104. In step S220, the system control unit 119 computes a focus evaluation peak value from a plurality of obtained and stored focus evaluation values and expected positions P associated with those focus evaluation values and determines a position of the F lens 104 at which the focus evaluation value reaches its peak as an in-focus position. After that, the process in FIG. 7 is ended.

While the steps S207 to S217 are being repeatedly executed, "mountain obtainment scanning" is performed. Thus, in the state where the F lens 104 is being driven so as to obtain focus evaluation values, the F lens 104 is drivingly controlled by correcting a drive speed for the F lens 104 (steps S214, S215). Namely, the system control unit 119 calculates a speed correction amount $\Delta V$ for the F lens 104 based on an amount by which the vibration isolation lens 103 has moved, and controls a moving speed of the F lens 104 based on the calculated speed correction amount $\Delta V$. This is carried out with the second correction period T2. This control method differs from driving of the F lens 104 aimed at correcting its speed, which is carried out while the steps S103 to S110 are being repeatedly executed. Thus, a method of controlling the F lens 104 is determined according to whether or not the F lens 104 is being driven for the mountain obtainment scanning, and with the determined method, driving of the F lens 104 is controlled based on an amount by which the vibration isolation lens 103 has moved. This prevents a reduction in subject contrast caused by the vibration isolation lens 103 widely deviating from the optical axis while preventing AF control from failing.

According to the present embodiment, when the F lens 104 is not being driven for the mountain obtainment scanning, a shake is corrected for by controlling a position of the F lens 104. On the other hand, when the F lens 104 is being driven for the mountain obtainment scanning, correct focus evaluation values are obtained by controlling a moving speed of the F lens 104. This makes it possible to properly correct for a shake while obtaining correct focus evaluation values Moreover, the first correction period T1 is changed according to whether or not moving images are being taken, and the first correction period T1 is set to a smaller value when moving images are being taken than when no moving images are being taken. This enables accurate focus correction for moving images while reducing power consumption when no moving images are being taken. Furthermore, the first correction period T1 is changed according to a degree of change in F lens position correction amount, and this enables accurate focus correction and reduces power consumption at the same time.

Further, since the second correction period T2 is set to a smaller value than the first correction period T1, a speed of the F lens 104 is corrected with increased accuracy, and effects on AF control are reduced. It should be noted that the second correction period T2 may be the same as the first correction period T1.

It should be noted that the second correction period T2 may be varied according to a degree of change in speed correction amount $\Delta V$. For example, a degree of change in speed correction amount $\Delta V$ is large, the first correction period T2 is shorter than when a degree of change in speed correction amount $\Delta V$ is small. As a result, even when, for example, the position of the vibration isolation lens frequently and largely changes due to strong camera shake, speed is corrected with high accuracy, enabling accurate focus correction while at the same time reducing power consumption.

It should be noted that a part or all of the above described processes associated with driving control of the vibration isolation lens 103 and the F lens 104 may be carried out by a control unit which the lens barrel 101 has. Therefore, the image stabilization apparatus according to the present invention may be configured as an interchangeable lens barrel or implemented as a main body of an image pickup apparatus with interchangeable lenses. Alternatively, the image stabilization apparatus may be configured to be contained in an image pickup apparatus of a camera/lens combo type. Moreover, the image pickup apparatus should not necessarily be a digital camera but may be other optical equipment such as a digital still camera, a video camera, a television camera, binoculars, a telescope, and a spotting scope.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-Ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-084413, filed Apr. 20, 2016 which is hereby incorporated by reference herein in its entirety.

What is claimed is:

1. An image stabilization apparatus which, based on a shake detected by a detector that detects a shake, causes a correction unit constituting a part of a shooting optical system to move in a direction different from a direction of an optical axis of the shooting optical system, comprising at least one processor that functions, according to at least one program stored in a memory, as units comprising:

an obtaining unit configured to move a focus lens in the direction of the optical axis to obtain focus evaluation values based on an image pickup signal obtained by taking an image of a subject; and a control unit configured to determine and select a method of controlling the focus lens according to a determination whether the focus lens is being moved, and with said selected method, control movement of the focus lens in the direction of the optical axis based on a determined amount by which the correction unit has been moved.

2. The image stabilization apparatus according to claim 1, wherein when the focus lens is not being moved, said control unit calculates a position correction amount for the focus lens based on the amount by which the correction unit has moved, and controls a position of the focus lens based on the calculated position correction amount.

3. The image stabilization apparatus according to claim 2, wherein with a first period, said control unit calculates the position correction amount, and controls a position of the focus lens based on the calculated position correction amount.

4. The image stabilization apparatus according to claim 3, wherein said control unit changes the first period according to whether moving images are being taken.

5. The image stabilization apparatus according to claim 4, wherein in a case where moving images are being taken, said control unit sets the first period to a smaller value than in a case where no moving images are being taken.

6. The image stabilization apparatus according to claim 3, wherein said control unit changes the first period according to a degree of change in the calculated position correction amount.

7. The image stabilization apparatus according to claim 1, wherein when the focus lens is being moved, said control unit calculates a speed correction amount for the focus lens based on the amount by which the correction unit has moved, and controls a moving speed of the focus lens based on the calculated speed correction amount.

8. The image stabilization apparatus according to claim 7, wherein when the calculated speed correction amount is not greater than a predetermined speed, said control amount controls the moving speed of the focus lens to the predetermined speed.

9. The image stabilization apparatus according to claim 7, wherein with a second period, said control unit calculates a speed correction amount for the focus lens based on the amount by which the correction unit has moved, and controls the moving speed of the focus lens based on the calculated speed correction amount.

10. The image stabilization apparatus according to claim 9, wherein said control unit changes the second period according to a degree of change in the calculated speed correction amount.

11. The image stabilization apparatus according to claim 3, wherein when the focus lens is being moved, said control unit calculates, with a period shorter than the first period, a speed correction amount for the focus lens based on the amount by which the correction unit has moved, and controls a moving speed of the focus lens based on the calculated speed correction amount.

12. The image stabilization apparatus according to claim 3, wherein when the focus lens is being moved, said control unit calculates, with the same period as the first period, a speed correction amount for the focus lens based on the amount by which the correction unit has moved, and controls a moving speed of the focus lens based on the calculated speed correction amount.

13. An image pickup apparatus comprising:
an image stabilization apparatus configured to, based on a shake detected by a detector that detects a shake, cause a correction unit constituting a part of a shooting optical system to move in a direction different from a direction of an optical axis of the shooting optical system; and
an image pickup device configured to obtain an image pickup signal by taking an image of a subject, wherein said image stabilization apparatus comprises at least one processor that functions, according to at least one program stored in a memory, as units comprising: an obtaining unit configured to move a focus lens in the direction of the optical axis to obtain focus evaluation values based on the image pickup signal obtained by taking the image of the subject, and
a control unit configured to determine and select a method of controlling the focus lens according to a determination whether the focus lens is being moved, and with said selected method, control movement of the focus lens in the direction of the optical axis based on a determined amount by which the correction unit has been moved.

14. A control method for an image stabilization apparatus which, based on a detected shake, causes a correction unit constituting a part of a shooting optical system to move in a direction different from a direction of an optical axis of the shooting optical system, comprising:
an obtaining step of moving a focus lens in the direction of the optical axis to obtain focus evaluation values based on an image pickup signal obtained by taking an image of a subject; and
a control step of determining and selecting a method of controlling the focus lens according to a determination whether the focus lens is being moved, and with said selected method, controlling movement of the focus lens in the direction of the optical axis based on a determined amount by which the correction unit has moved.

15. A non-transitory computer-readable storage medium storing a program for causing a computer to execute a control method for an image stabilization apparatus which, based on a detected shake, causes a correction unit constituting a part of a shooting optical system to move in a direction different from a direction of an optical axis of the shooting optical system, the control method comprising:
an obtaining step of moving a focus lens in the direction of the optical axis to obtain focus evaluation values based on an image pickup signal obtained by taking an image of a subject; and
a control step of determining and selecting a method of controlling the focus lens according to a determination whether the focus lens is being moved, and with said selected method, controlling movement of the focus lens in the direction of the optical axis based on a determined amount by which the correction unit has moved.

* * * * *